United States Patent [19]

Kruckenberg et al.

[11] Patent Number: 4,497,736
[45] Date of Patent: Feb. 5, 1985

[54] AZO DYESTUFFS

[75] Inventors: Winfried Kruckenberg; Karl H. Schündehütte, both of Leverkusen, Fed. Rep. of Germany

[73] Assignee: Bayer Aktiengesellschaft, Leverkusen, Fed. Rep. of Germany

[21] Appl. No.: 962,253

[22] Filed: Nov. 17, 1978

[30] Foreign Application Priority Data

Nov. 19, 1977 [DE] Fed. Rep. of Germany ....... 2751784

[51] Int. Cl.³ ................... C09B 29/01; C09B 29/085; D06P 1/18; D06P 3/54
[52] U.S. Cl. .................................................. 534/855
[58] Field of Search ................... 260/205, 206, 207.1, 260/207, 207.5

[56] References Cited

U.S. PATENT DOCUMENTS

| | | | |
|---|---|---|---|
| 2,266,142 | 12/1941 | Adams | 260/207.5 |
| 2,359,305 | 10/1944 | Dickey et al. | 260/207.5 |
| 2,475,228 | 7/1949 | Felix et al. | 260/205 |
| 3,342,803 | 9/1967 | Artz et al. | 260/207.1 |
| 3,445,454 | 5/1969 | Fishwick et al. | 260/207.5 |
| 3,449,319 | 10/1969 | Kuhn | 260/207.5 |
| 4,053,465 | 10/1977 | Kruckenberg | 260/206 |
| 4,111,930 | 9/1978 | Meybeck | 260/207.1 |
| 4,119,624 | 10/1978 | Boyd et al. | 260/207.1 |

Primary Examiner—Y. Harris-Smith
Attorney, Agent, or Firm—Sprung, Horn, Kramer & Woods

[57] ABSTRACT

Azo dyestuffs of the formula

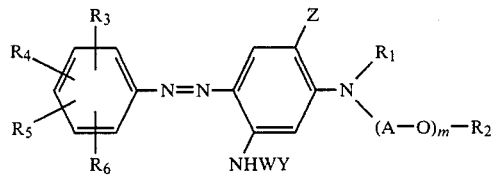

wherein
$R_1$ represents H or —A—V
$R_2$ represents, inter alia, H, alkyl, chloroalkyl, cyanoalkyl, phenyl, phenalkyl, cyclohexyl or alkylcarbonyl,
$R_3$ and Z represent H, alkyl or halogen,
$R_4$ represents $R_3$, alkoxy or CN,
$R_5$ represents, inter alia, $NO_2$, CN, $CF_3$ or alkylsulphonyl,
$R_6$ represents $R_4$, $CF_3$, CN or $NO_2$,
A represents alkylene
V represents H, alkoxy, CN, Cl, phenyl, phenoxy, alkylcarbonyl or alkoxycarbonyl,
W represents CO or $SO_2$,
Y represents H, alkyl, alkoxy, $NH_2$ or hydroxyalkyl and
m represents 4, 5, 6 or 7,
mixed with emulsifiers give dyestuff formulations which are in the liquid or dissolved form under dyeing conditions. The use of additional dispersing agents, protective colloids, levelling agents and carriers during the dyeing of polyester fibres thereby becomes superfluous.

2 Claims, No Drawings

AZO DYESTUFFS

The invention relates to azo dyestuffs of the formula

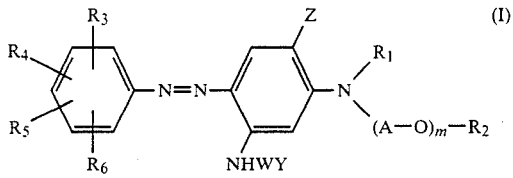

wherein
$R_1$ represents hydrogen or —A—V
$R_2$ represents hydrogen, alkyl, chloroalkyl, cyanoalkyl, phenyl, phenalkyl, cyclohexyl, alkylcarbonyl, alkylaminocarbonyl, alkoxycarbonyl, phenylcarbonyl or alkylsulphonyl,
$R_3$ represents hydrogen, alkyl or halogen,
$R_4$ represents $R_3$, alkoxy or CN,
$R_5$ represents $NO_2$, CN, $CF_3$, alkylsulphonyl, hydroxyalkylsulphonyl, alkoxycarbonyl, (di)-alkylaminosulphonyl or (di)-alkylaminocarbonyl,
$R_6$ represents $R_4$ $CF_3$, CN or $NO_2$,
A represents optionally alkyl-substituted $C_1$-$C_6$-alkylene
V represents hydrogen, alkoxy, CN, Cl, phenyl, phenoxy, alkylcarbonyl or alkoxycarbonyl,
Y represents hydrogen, alkyl, alkoxy, $NH_2$ or hydroxyalkyl,
W represents CO or $SO_2$,
Z represents hydrogen, halogen or alkyl and
m represents the numbers 4, 5, 6 or 7,
the alkyl and alkoxy radicals mentioned in any connection having 1–4 C atoms and optionally containing halogen substituents, and the cyclohexyl and phenyl radicals being optionally mono-, di- or tri-substituted by alkyl, alkoxy or halogen, halogen being understood as F, Cl or Br and W=CO, if Y=H.

Phenyl radicals being optionally monosubstituted to trisubstituted by alkyl, alkoxy or halogen and halogen being understood as F, Cl or Br.

Preferred dyestuffs correspond to the formula

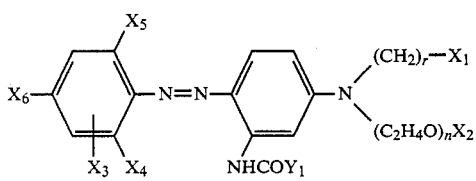

wherein
$X_1$ denotes hydrogen, CN, $OCH_3$ or $OC_2H_5$,
$X_2$ denotes hydrogen, $C_1$-$C_4$-n-alkyl or $C_1$-$C_4$-alkylcarbonyl,
$X_3$ denotes hydrogen or Cl,
$X_4$ denotes hydrogen, Cl, Br or CN,
$X_5$ and $X_6$ independently of one another denote Cl, Br, $NO_2$, CN, $CF_3$, $C_1$-$C_2$-alkylsulphonyl or hydrogen, but do not simultaneously denote hydrogen,
$Y_1$ denotes methyl or ethyl,
n denotes the number 4, 5 or 6 and
r denotes The numbers 2, 3 or 4.
Within the scope of formula II, dyestuffs in which $X_1$=H and
n=5 or 6 are preferred.
Dyestuffs of the formula II wherein
$X_1$ represents hydrogen
$X_2$ represents $C_1$-$C_4$-n-alkyl
$X_5$ and $X_6$ represent hydrogen, $NO_2$, CN, Cl or Br, but do not simultaneously represent hydrogen,
r represents the number 2 and
n represents the numbers 5 or 6,
the remaining radicals having the meaning given, are very particularly preferred.

The new dyestuffs are obtained, for example, by a process in which diazotised anilines of the formula

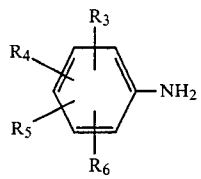

wherein $R_3$–$R_{16}$ have the abovementioned meaning, are coupled to compounds of the formula

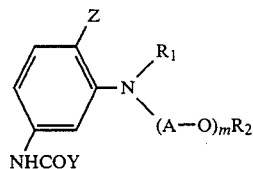

wherein R, $R_2$, A, Y, Z and m have the abovementioned meaning.

The coupling components of the formula IV are new and can be prepared, for example, by a process in which anilines of the formula

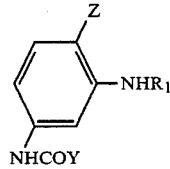

are reacted with compounds of the formula $$Q—(A—O)_m R_2 \quad \text{(VI)}$$

wherein Q represents halogen, preferably Cl, or

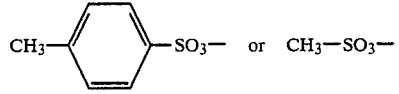

in a manner which is in itself known.

The compounds of the formula VI are known or are easily accessible by known methods (compare DT-OS (German Published Specification) No. 1,544,599, page 22), for example by oxyalkylating compounds of the formula $R_2OH$, subjecting the reaction product to fractional distillation, replacing the terminal OH group in the particular fractions by the radical Q (for example by reaction with $SOCl_2$ or methanesulphonyl chloride) and if appropriate distilling the product again in order to remove decomposition products.

The present invention further relates to dyestuff mixtures which consist of at least 2 dyestuffs of the formula

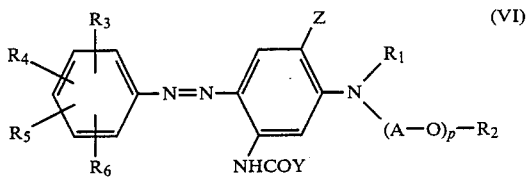

wherein
$R_1-R_6$, A, Z and Y have the abovementioned meaning and
p represents the numbers 2-8, preferably 3-6,
with the proviso that the individual dyestuffs differ from one another at least with respect to the number p.

These mixtures are appropriately obtained by a process in which diazotised anilines of the formula III are combined with mixtures of the compounds of the formula

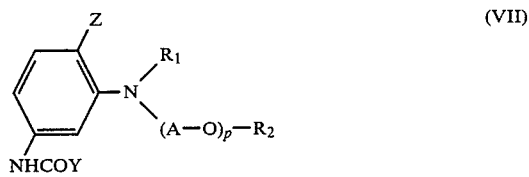

the components of the mixture differing at least with respect to p. The compounds of the formula VIII are obtained in an analogous manner to the compounds IV, by separating off by distillation the monoalkoxylation product, and advantageously also the dialkoxylation product, from the reaction products of $R_2OH$ with alkylene oxides, and then proceeding further as described above for the pure fractions.

The new dyestuffs are outstandingly suitable for dyeing and printing synthetic fibre materials, in particular those of aromatic polyesters and cellulose esters, on which they produce dyeings with good general fastness properties, in particular good fastness to sublimation, washing and light.

It is particularly advantageous to employ the dyestuffs in the form of liquid or pulverulent formulations which contain, in addition to the dyestuff, emulsifying polar/non-polar compounds and, if appropriate, formulating agents and extenders (in particular inorganic salts, such as NaCl and $Na_2SO_4$).

These formulations are distinguished by very high solubility in cold water.

In general, a molar ratio of dyestuff to emulsifier of 1:0.1 to 1:4 has proved advantageous; a ratio of 1:1 to 1:3 is preferred, an excess of emulsifier in general not being harmful. However, in practice a two-fold excess is generally completely adequate.

The preparation of the dyeing formulations is not bound to certain prerequisites with regard to apparatus. Spray-drying, drum-drying or drying in Venuleth apparatuses are just as suitable as simple drying on a metal tray, after combining the components in customary kettles, or as a combination of adduct formation and drying in the abovementioned apparatuses. It is particularly advantageous to mix the filter press cake, or the oily or pasty dyestuff such as is obtained direct during the preparation, with the emulsifiers and if appropriate to convert the mixture into the dry pulverulent form in a known manner. The fact that during any comminution of the dyestuff/emulsifier mixture no expensive fine comminution devices, such as bead mills and vibratory mills, have to be used, but that coarse grinding down to average particle sizes of not less than 50μ is completely adequate, should be singled out.

A list of suitable emulsifiers can be found in Table 1 of "Tenside Detergents", volume 11, 1974, number 4, page 186.

Preferred polar/non-polar compounds correspond to the general formula $$G—L \qquad (VIII)$$

wherein
G represents an aliphatic hydrocarbon radical with at least 10 C atoms and
L represents $—SO_3H$, $—O—SO_3H$ or $OPO_3H_2$ or the corresponding salts.

Examples which may be mentioned are: fatty acid soaps, such as sodium laurate, sodium oleate, sodium linoleate, ammonium ricinoleate, oleic acid esters of sodium isethionate or of sodium palmitate, sodium bis-(2-ethylhexyl)-sulphosuccinate, sodium N-methyl-N-oleyltaurate, β-(tert.-octylphenoxy)-diethyl ether-β'-(Na sulphonate), sodium isododecylbenzenesulphonate, sodium dodecyl-sulphate, sodium N-oleylsulphanilate, dodecyl-phosphonic acid, sodium dodecylbenzimidazolesulphanate, alkoxyarylsulphates, alkylsulphaminoaryl compounds, dodecylphenolsulphate, dodecylbenzenesulphamic acid, dibutylnaphtholsulphate and dioctylnaphtholsulphate. Cationic detergents agents which may be mentioned are dodecylamine acetate, dodecylbenzyldimethylammonium chloride and heptadecyl N-aminoethyl)imidazoline-acetate.

The new dyeing formulations are in the liquid or dissolved form under dyeing or printing conditions. The use of additional surface-active agents, such as dispersing agents, protective colloids or levelling agents, or of carriers thereby becomes superfluous in most cases of dyeing and printing.

In the Examples which follow, "parts" denote parts by weight.

EXAMPLE 1

197.5 parts of 2-cyano-4-nitro-6-chloroaniline are introduced into a mixture of 1,700 parts by weight of 85% strength phosphoric acid and 400 parts of glacial acetic acid, whilst stirring. 170 parts by volume of nitrosylsulphuric acid (100 parts by volume contain 42 parts by weight of nitrite) are then added dropwise at below −2° C. in the course of one hour. The mixture is subsequently stirred at −2° C. for a further 4-5 hours, during which all the components dissolve.

The diazonium salt solution thus obtained is now stirred in a thin jet into a solution of 437 parts by weight of the base

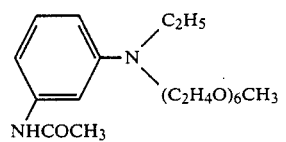

in 400 parts by volume of glacial acetic acid and 2,500 parts by volume of ice-water, whilst stirring well, 6,500 parts by weight of ice being added. After one hour, the mixture is buffered with 1,480 parts by volume of 45% strength sodium hydroxide solution and stirred overnight. The oily dyestuff which has separated out is washed with water until neutral and free salts and is isolated.

If 1 part of the dyestuff thus obtained is stirred with 0.8 to 1 part of myristyl sulphate, a little water being added and the mixture being warmed briefly, an oily formulation is obtained which dissolves in the dyebath to give a clear solution. A blue dyeing with good fastness properties is obtained from this dyebath on polyester in the customary manner, for example at 120° C.

If the procedure followed is as in Example 1 above, but the starting materials listed in the Table below are used, valuable azo dyestuffs which give, on polyester, dyeings with the colour shades indicated in the last column are likewise obtained.

| No. | Diazo component | Coupling component | Colour shade |
|---|---|---|---|
| 2 | 2-amino-3-cyano-6-nitro-chlorobenzene ($O_2N$-, -Cl, -$NH_2$, -CN) | 3-(N-ethyl-N-($C_2H_4O$)$_5COCH_3$)-acetamidoaniline | blue |
| 3 | 2-amino-3-cyano-6-sulfo-benzene ($O_2H$-, -$NH_2$, -CN) | 3-(N-ethyl-N-($C_2H_5O$)$_5CH_3$)-acetamidoaniline | violet |
| 4 | 2-amino-3-cyano-6-nitrobenzene ($O_2N$-, -$NH_2$, -CN) | 3-(N-$C_2H_4CN$-N-($C_2H_4O$)$_{4-6}$-$CH_3$)-acetamidoaniline | red-violet |
| 5 | 2-amino-3-cyano-6-nitro-bromobenzene ($O_2N$-, -Br, -$NH_2$, -CN) | 3-(N-ethyl-N-($C_2H_4O$)$_4CH_3$)-acetamidoaniline | blue |
| 6 | 2-amino-3-cyano-6-nitro-chlorobenzene ($O_2N$-, -Cl, -$NH_2$, -CN) | 3-(N-$C_2H_5OCH_3$-N-($C_2H_4O$)$_6CH_3$)-acetamidoaniline | " |
| 7 | 2-amino-3-cyano-4,6-dinitrobenzene ($O_2N$-, -CN, -$NH_2$, -$NO_2$) | 3-(N-ethyl-N-($C_2H_4O$)$_5C_2H_5$)-acetamidoaniline | " |
| 8 | 2-amino-3-cyano-6-nitrobenzene ($O_2N$-, -$NH_2$, -CN) | 3-(N-ethyl-N-($C_2H_4O$)$_5C_2H_4CN$)-acetamidoaniline | violet |
| 9 | " | 3-(N-ethyl-N-($C_2H_4O$)$_{4-7}$-phenyl)-NHCOCH$_2$OH-aniline | " |

-continued

| No. | Diazo component | Coupling component | Colour shade |
|---|---|---|---|
| 10 | " | 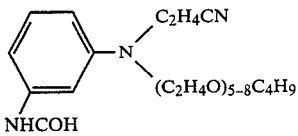 3-(N-C₂H₄CN)(N-(C₂H₄O)₅₋₈C₄H₉)amino, NHCOH | red-violet |
| 11 | " | 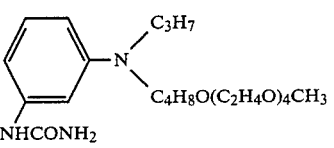 3-(N-C₃H₇)(N-C₄H₈O(C₂H₄O)₄CH₃)amino, NHCONH₂ | violet |
| 12 | " | 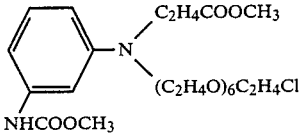 3-(N-C₂H₄COOCH₃)(N-(C₂H₄O)₆C₂H₄Cl)amino, NHCOOCH₃ | " |
| 13 | " | 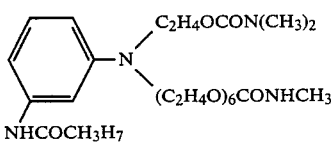 3-(N-C₂H₄OCON(CH₃)₂)(N-(C₂H₄O)₆CONHCH₃)amino, NHCOC₃H₇ | " |
| 14 | 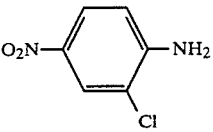 4-O₂N, 2-Cl aniline | 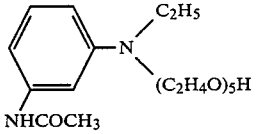 3-(N-C₂H₅)(N-(C₂H₄O)₅H)amino, NHCOCH₃ | red |
| 15 | 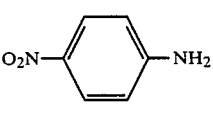 4-O₂N aniline | 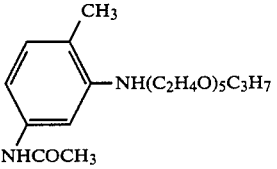 2-CH₃, 3-NH(C₂H₄O)₅C₃H₇, 5-NHCOCH₃ | orange |
| 16 | " | 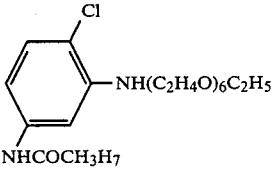 2-Cl, 3-NH(C₂H₄O)₆C₂H₅, 5-NHCOC₃H₇ | " |
| 17 | " | 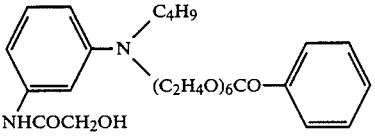 3-(N-C₄H₉)(N-(C₂H₄O)₆CO-phenyl)amino, NHCOCH₂OH | red |
| 18 | 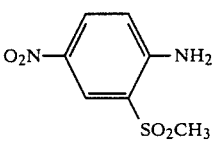 4-O₂N, 2-SO₂CH₃ aniline | 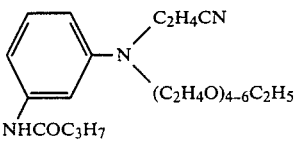 3-(N-C₂H₄CN)(N-(C₂H₄O)₄₋₆C₂H₅)amino, NHCOC₃H₇ | " |

-continued

| No. | Diazo component | Coupling component | Colour shade |
|---|---|---|---|
| 19 | O₂N—C₆H₃—NH₂ (4-nitroaniline) | 3-(N-benzyl-N-(C₂H₄O)₅CH₃)amino-acetanilide (NHCOCH₃) | " |
| 20 | " | 3-(N-(C₂H₄Ophenyl)-N-(C₂H₄)₃₋₆CH₃)amino-acetanilide (NHCOCH₃) | " |
| 21 | 4-amino-2-chlorobenzonitrile (NC, Cl, NH₂) | 3-(N-C₂H₅-N-(C₂H₄O)C₂H₅)amino-acetanilide (NHCOCH₃) | scarlet |
| 22 | 2-amino-4-chlorobenzonitrile (Cl, NH₂, CN) | 3-(N-C₂H₄CN-N-(C₂H₄O)₄₋₆C₄H₉)amino-chloroacetanilide (NHCOCH₂Cl) | " |
| 23 | 2-amino-3-chloro-5-nitro... (O₂N, NH₂, Cl) | 3-(N-C₂H₄CN-N-(C₂H₄O)₃₋₇C₄H₉)amino-formanilide (NHCOH) | red |
| 24 | 2-amino-3,5-dicyanobenzene (NC, NH₂, CN) | 3-(N-CH₃-N-(C₂H₄O)₃₋₅COCH₃)amino-acetanilide (NHCOCH₃) | " |
| 25 | " | 3-(N-C₂H₄CN-N-(C₂H₄O)₅CH₃)amino-acetanilide (NHCOCH₃) | " |
| 26 | 2-amino-4-chlorobenzonitrile (Cl, NH₂, CN) | 3-(N-C₂H₅-N-(C₂H₄O)₃₋₇CH₃)amino-acetanilide (NHCOCH₃) | scarlet |
| 27 | 2-amino-3-chloro-5-nitrobenzonitrile (Cl, O₂N, NH₂, CN) | 3-(N-C₂H₅-N-(C₂H₄O)₃₋₆CH₃)amino-acetanilide (NHCOCH₃) | blue |

-continued

| No. | Diazo component | Coupling component | Colour shade |
|---|---|---|---|
| 28 | 2-amino-benzonitrile (NH$_2$, CN on benzene) | 3-(N-C$_2$H$_5$, N-(C$_2$H$_4$O)$_5$C$_2$H$_4$CN)-NHCOCH$_3$-benzene | scarlet |
| 29 | O$_2$N—, NH$_2$, CF$_3$ substituted benzene | 3-(N-C$_2$H$_4$OC$_2$H$_5$, N-(C$_2$H$_4$O)$_{3-6}$CH$_3$)-NHCOCH$_3$-benzene | red |
| 30 | O$_2$N—, NH$_2$, Cl substituted benzene | 3-(N-CH$_3$, N-(C$_2$H$_4$O)$_{3-6}$C$_3$H$_7$—n)-NHCOCH$_3$-benzene | " |
| 31 | O$_2$N—, CH$_3$, NH$_2$, Cl substituted benzene | " | " |
| 32 | 2-amino-1,4-dicyanobenzene (CN, NH$_2$, CN) | 3-(N-C$_2$H$_4$Cl, N-(C$_2$H$_3$O)$_{4-6}$C$_2$H$_4$Cl)-NHCOH-benzene | scarlet |
| 33 | NC—, CH$_2$, NC substituted benzene | " | " |
| 34 | Cl—, CN, NH$_2$, CN substituted benzene | 3-(N-C$_2$H$_4$Cl, N-(C$_2$H$_4$O)$_{4-6}$C$_2$H$_4$Cl)-NHCOH-benzene | " |
| 35 | NC—C$_6$H$_4$—NH$_2$ | " | orange |
| 36 | O$_2$N—, CN, NH$_2$, CN substituted benzene | 3-(N-C$_2$H$_5$, N-(C$_2$H$_4$O)$_{4-7}$CH$_3$)-NHCOCH$_3$-benzene | blue |
| 37 | " | 3-(N-C$_2$H$_4$CN, N-(C$_2$H$_3$O)$_{.7}$C$_4$H$_9$)-NHCOCH$_3$-benzene | " |

-continued

| No. | Diazo component | Coupling component | Colour shade |
|---|---|---|---|
| 38 | " | 3-(N-ethyl-N-(C$_2$H$_4$O)$_6$H)-NHCOCH$_2$OH-aniline | " |
| 39 | 5-methyl-2-amino-1,3-dicyanobenzene | 3-(N-methyl-N-(C$_2$H$_4$O)$_{4-6}$CH$_3$)-NHCOCH$_3$-aniline | red |
| 40 | 5-chloro-2-amino-1,3-dicyanobenzene | 3-(N-C$_2$H$_4$CN-N-(C$_2$H$_4$O)$_{4-7}$C$_4$H$_9$)-NHCOCH$_3$-aniline | ruby |
| 41 | 2,5-dichloro-4-amino-benzonitrile | 3-(N-ethyl-N-(C$_2$H$_4$O)$_6$H)-NHCOCH$_3$-aniline | scarlet |
| 42 | 4-nitro-2-chloro-aniline | 3-(N-C$_2$H$_4$OCH$_3$-N-(C$_2$H$_4$O)$_{3-5}$C$_2$H$_4$CO$_2$CH$_3$)-NHCOCH$_3$-aniline | red-violet |
| 43 | 4-nitro-2-(SO$_2$N(CH$_3$)$_2$)-aniline | 3-(N-ethyl-N-(C$_2$H$_4$O)$_{3-6}$C$_2$H$_5$)-NHCOCH$_3$-aniline | violet |
| 44 | 4-nitro-2-cyano-aniline | 3-(N-methyl-N-(C$_2$H$_4$O)$_4$SO$_2$CH$_3$)-NHCOCH$_3$-aniline | " |
| 45 | " | 3-(N-CH$_2$CH(CH$_3$)$_2$-N-(C$_2$H$_4$O)$_4$CH$_3$)-NHCOCH$_3$-aniline | " |
| 46 | " | 3-(N-C$_2$H$_4$OH-N-(C$_2$H$_4$O)$_6$-phenyl)-NHCOCH$_3$-aniline | " |

PREPARATION INSTRUCTIONS FOR PREFERRED COUPLING COMPONENTS (a) A total of 30 mols (1,320 g) of ethylene oxide is metered batchwise into an autoclave, which is charged with 10 mols (320 g) of methanol and 1 g of sodium hydroxide, in a manner such that the internal pressure does not exceed 6 bars at an operating temperature of, preferably, 100°–130° C. After cooling, the contents of the autoclave are transferred to a distillation flask and are distilled under 12 mm Hg up to a head temperature of 128° C. The distillate is discarded. The residue corresponds to the general formula $HO-(C_2H_4O)_{3-5}-CH_3$ (b) A mixture of 4,060 g of this polyether mixture and 20 g of dimethylformamide is added dropwise to 1,400 ml of $SOCl_2$ at 30°–35° C. in the course of 1 hour. The mixture is then heated to 70° C. and subsequently stirred at this temperature for 2 hours. A waterpump vacuum is then applied and all the volatile constituents are distilled off until a vacuum of 20 mm Hg has been established at a bath temperature of 100° C. The residue is filtered. 4,280 g of a liquid are obtained which consists mainly of the chloride of the formula $Cl(C_2H_4O)_{3-5}-CH_3$.

(c) A mixture of 269 g of this chloride, 177 g of m-acetylamino-N-ethylaniline, 80 g of $CaCO_3$ and 10 ml of water is heated at 150°–160° C. for 15 hours. The cooled reaction mixture is stirred thoroughly at 60° C. with 250 ml of $H_2O$ and 80 g of $Na_2SO_4$. The gypsum formed is then filtered off whilst warm and washed with a little water and the oily filtrate is freed from volatile constituents (essentially water) by applying a waterpump vacuum. The aniline of the general formula

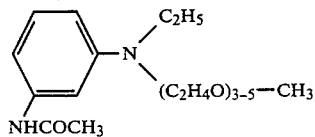

thus obtained is sufficiently pure for subsequent coupling reactions.

Other coupling components to be employed according to the invention can also be prepared in accordance with the same principle, by reacting suitable alcohols or phenols with 2–5, preferably about 3, mols of an alkylene oxide in the presence of an alkali, distilling off the monoalkoxylation products, and if appropriate the dialkoxylation products, converting the residue into the corresponding halides, tosylates or methylates and reacting these with suitable 3-acylamino-N-alkylanilines.

We claim:

1. Azo dyestuffs of the formula

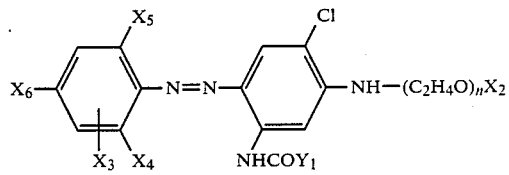

wherein
 $X_2$ denotes hydrogen, $C_1$–$C_4$-n-alkyl or $C_1$–$C_4$-alkylcarbonyl,
 $X_3$ denotes hydrogen or Cl,
 $X_4$ denotes hydrogen, Cl, Br or CN,
 $X_5$ and $X_6$ independently of one another denote Cl, Br, $NO_2$, CN, $CF_3$, $C_1$–$C_2$-alkylsulphonyl or hydrogen, but do not simultaneously denote hydrogen,
 $Y_1$ denotes methyl, ethyl, or propyl and
 n denotes the numbers 4, 5 or 6.

2. Azo dyestuff according to claim 1, of the formula

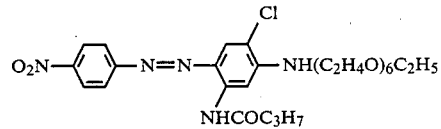

* * * * *